United States Patent [19]

Bessette

[11] Patent Number: 4,700,582
[45] Date of Patent: Oct. 20, 1987

[54] ANTI-BACKLASH GEAR MECHANISM

[75] Inventor: Ramon L. Bessette, Detroit, Mich.

[73] Assignee: Ford Motor Company, Dearborn, Mich.

[21] Appl. No.: 740,103

[22] Filed: May 31, 1985

[51] Int. Cl.⁴ ............................................. F16H 55/18
[52] U.S. Cl. ...................................... 74/409; 74/411; 74/440; 74/443
[58] Field of Search .................. 74/409, 440, 411, 443, 74/445

[56] References Cited

U.S. PATENT DOCUMENTS

| | | |
|---|---|---|
| 1,435,571 | 11/1922 | Wright . |
| 1,748,820 | 2/1930 | Alexandrescu . |
| 1,750,679 | 3/1930 | Mitchell . |
| 2,607,238 | 8/1952 | English et al. . |
| 2,659,244 | 11/1953 | Guy ........................................ 74/409 |
| 2,845,809 | 8/1958 | Hetzel . |
| 3,037,396 | 6/1962 | Martin ................... 74/409 |
| 3,127,784 | 4/1964 | O'Neill . |
| 3,318,193 | 5/1967 | Rogg . |
| 3,365,973 | 1/1968 | Henden . |
| 3,487,706 | 1/1970 | Resener ................... 74/440 |
| 3,496,794 | 2/1970 | Forichon . |
| 3,535,948 | 10/1970 | Winzeler et al. . |
| 3,648,534 | 3/1972 | Fagarazzi . |
| 3,682,015 | 8/1972 | Richardson ........................... 74/409 |
| 3,803,935 | 4/1974 | Nozawa ................. 74/409 |
| 3,803,936 | 4/1974 | Kroeper ................. 74/409 |

FOREIGN PATENT DOCUMENTS

| | | | |
|---|---|---|---|
| 390314 | 7/1973 | U.S.S.R. ................................. 74/409 |
| 0872872 | 10/1981 | U.S.S.R. ................................. 74/409 |

OTHER PUBLICATIONS

*IBM Technical Disclosure Bulletin* vol. 14 No. 5 "Anti-Backlash Gear" Arseneault et al. Oct. 1971.

Primary Examiner—Lawrence Staab
Assistant Examiner—Martin G. Belisario
Attorney, Agent, or Firm—Frank G. McKenzie; Donald J. Harrington

[57] ABSTRACT

In a manual power transmission for automotive vehicles, a gear noise suppressor and vibration isolator includes elastomeric sleeve preferably fitted within several holes through the thickness of the gear wheel, angularly spaced about the axis of the wheel. The spacers define a space within which a metal sleeve is inserted and the sleeve defines a central bore through which a pin is fitted. A load plate located adjacent an end face of gear wheel has teeth formed on its outer periphery which are adapted to mesh with the teeth of an input pinion with which the gear wheel is continuously engaged. Pins having a headed end that abuts the load plate hold the plate in contact with the elastomeric sleeves and prevent contact of the load plate against the gear wheel. The sleeves resiliently deflect and permit engagement of the load plate and gear wheel with the drive pinion. The sleeves resiliently bias the teeth of the load plate against the trailing faces of the pinion teeth and the driving faces of the pinion teeth contact the teeth of the gear wheel.

12 Claims, 5 Drawing Figures

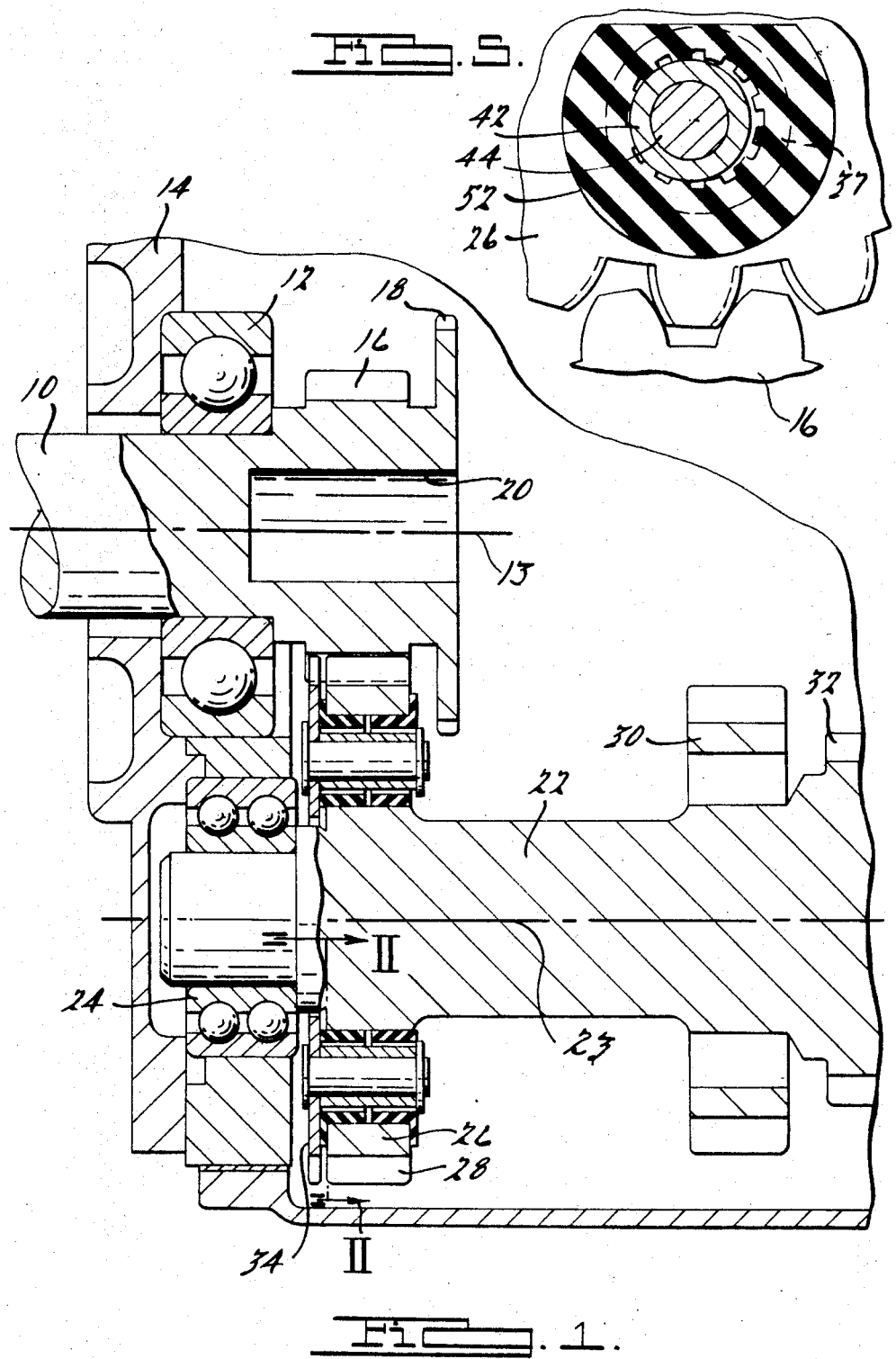

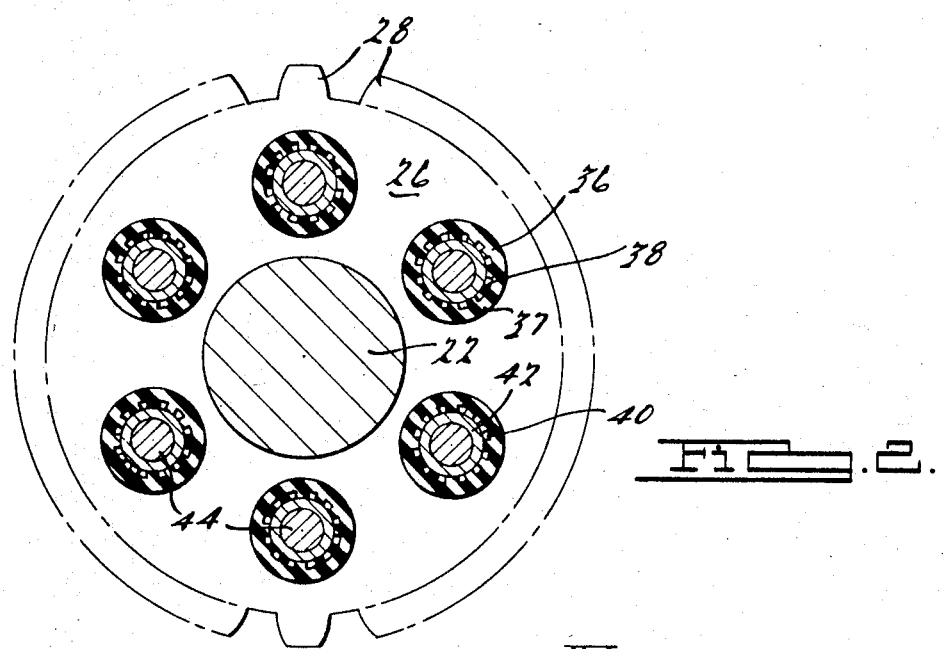
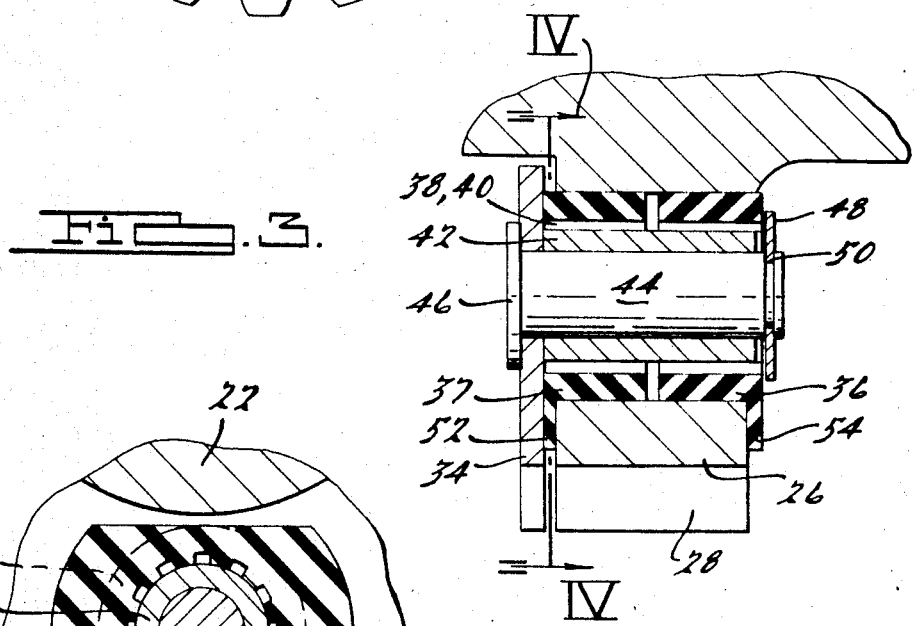
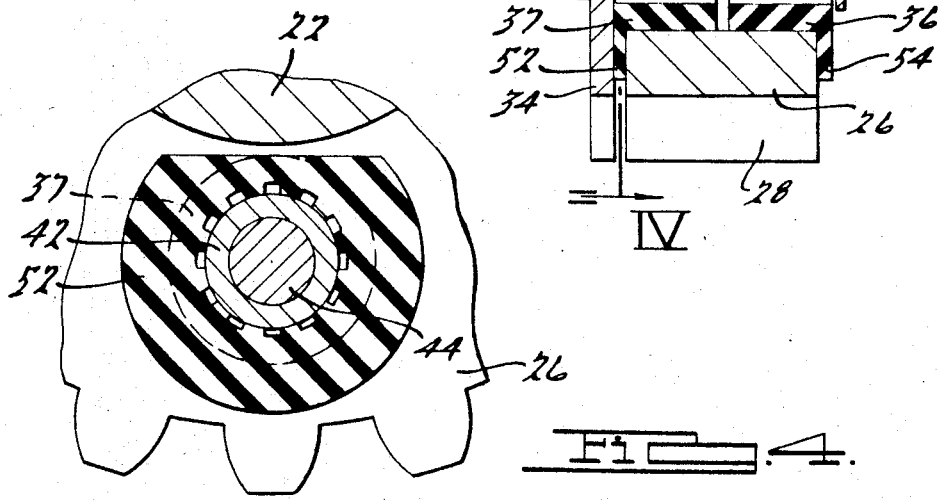

ANTI-BACKLASH GEAR MECHANISM

BACKGROUND OF THE INVENTION

1. Field of the Invention

This invention relates to the field of noise suppression in mechanical equipment and more particularly pertains to noise suppression in gearing, especially backlash noise in automotive manual transmission gearing.

2. Description of the Prior Art

When the engine of a motor vehicle is idling and the neutral clutch that connects the engine to a manual transmission is disengaged, the speed of the engine varies as a result of the cyclic irregularity that is intrinsic in the operation of an internal combustion engine. Countershaft manual transmissions for automotive use contain gearsets whose members are in continuous meshing engagement, though the gear selector of the transmission be in the neutral position. When the neutral clutch is engaged and the gear selector is in the neutral position, the speed changes of the engine, transmitted to the gearset, produce noise called gear rattle. When the engaged gear teeth change position with respect to each other due to the engine speed variations, the teeth of the driven gear contact alternately the driving face and the non-driving face of the driving pinion.

In order to reduce or eliminate the objectionable noise that results from this contact, various devices have been employed to take up the clearance between the faces of the gear and the pinion. Such devices include a wheel coaxial with the gear having similar teeth to those of the gear and means for elastically maintaining the teeth of the wheel in a position that is angularly offset relative to the gear. Usually a mechanical spring, such as a helical spring located radially offset from the axis of the gear, applies a force, directed tangentially to the axis, tending to rotate the annular element with respect to the gear wheel. Examples of devices of this type are described in the following U.S. Pat. Nos. 1,435,571; 1,748,820; 1,750,679; 2,607,238; 3,365,973; 3,496,794; 3,535,948; 3,648,534 and 3,803,936.

The prior art described resilient means other than a mechanical spring for biasing the annular member angularly with respect to the gear. But the uniformity of the springs and their equivalents, their loading and the degree of tooth displacement between the toothed wheel and the gear is difficult to control. In the combination of a gear and wheel with springs under compression or tension it is difficult to assembly and control the preload uniformly. Furthermore, spring preloaded gears require generally a widely spaced gear arrangement, whereas anti-backlash gearing in a narrow space is usually required in a narrow space. The teeth of the gear and the teeth of the wheel are first angularly offset and then the gear and wheel are mechanically connected by a soft resilient elastic member such as a pin or rivet made from rubber or another elastomer. Later when the gear is assembled in a transmission, the wheel is rotated with respect to the gear until their teeth are more nearly aligned sufficiently to mesh with the teeth of a pinion with which the gear transmits power. The resilient member maintains a biasing force between the wheel and the pinion which prevents backlash. Examples of this arrangement are described in U.S. Pat. Nos. 2,845,809; 3,127,784 and 3,318,193.

SUMMARY OF THE INVENTION

According to the present invention, in a gearset which includes first and second gear wheels, each having teeth meshing with the teeth of the other gear wheel, a gear rattle and noise suppression device is included to eliminate impact loading and noise that results from engine speed variations. A load plate mounted on one of the gear wheels, preferably the gear wheel that is driven by a pinion, is included in the gearset. The load plate is carried coaxially with the gear wheel and has teeth that are adapted to mesh with the teeth of the pinion. The load plate also has a hole that is spaced radially from the axis of the load plate. The gear wheel on which the plate is mounted has at least one hole spaced radially from its axis, the center of the hole being offset angularly from the center of the hole of the load plate when the teeth of the load plate and of the gear wheel are arranged to mesh with the teeth of the pinion. A spacer made from soft, elastically resilient material, such as an elastomer, is located in the holes of the gear wheel and has a radial flange located between the load plate and adjacent face of the gear wheel. The flange holds the gear wheel and load plate apart. The spacer includes another flange that bears on the opposite face of the gear wheel. A sleeve is inserted through the spacer and grips the inner surface of the spacer through the engagement of axially directed serrations. A pin, inserted through a bore in the spacer and through the hole in the load plate, has a headed end held in contact with the load plate and a second end held in contact with the elastomeric spacer.

This arrangement acoustically isolates the load plate from the gear wheel on which it is carried. The pin, which provides a mechanical connection between the load plate and the gear wheel, is supported on the gear wheel by contact on the elastomeric spacer thereby acoustically isolating the pin from the gear wheel.

The load plate and gear are assembled by first rotating the teeth of the plate with respect to the gear wheel. This rotation brings the holes of the load plate into alignment with the bore of the spacer, permits the pin to be inserted and provides a resilient biasing force tending to maintain the load plate in contact against the flanks of the tooth on the pinion with which it meshes. The resilient nature of the elastomeric spacer maintains the biasing force and operates to isolate the load plate from a gear wheel and to attenuate vibrations.

BRIEF DESCRIPTION OF THE DRAWINGS

FIG. 1 is a cross section of a manual automotive transmission through a plane containing the center lines of an input shaft and a countershaft.

FIG. 2 is a cross section taken at plane II—II of FIG. 1.

FIG. 3 is an enlarged cross section through a diametral plane of a gear wheel, load plate and backlash suppressor.

FIG. 4 is an end view taken at plane IV—IV of FIG. 3.

FIG. 5 is a cross section similar to FIG. 4 but showing the angular offset between holes through the load plate and gear.

DESCRIPTION OF THE PREFERRED EMBODIMENT

Referring now to FIG. 1, the input shaft 10 of a manual transmission, which conventionally is connected through a neutral clutch to the engine crankshaft, is rotatably mounted on the casing 14 of the transmission by bearings 12 for rotation about an axis 13. The input shaft includes an integral input pinion wheel 16 having gear teeth formed at its periphery and a wheel having clutching teeth 18, which can be selectively engaged by a synchronizer clutch and thereby driveably connected to an output shaft whose axis is aligned with the axis of the input shaft. The output shaft is rotatably supported by a bearing located within a pocket 20 formed in the end face of the input shaft. The transmission includes a countershaft 22, whose axis 23 is directed parallel to the axis 13 of the input shaft and which is rotatably mounted on the casing of the transmission by a bearing 24. The countershaft is formed integrally with multiple forward drive ratio gears 30, 32 and with an input gear wheel 26 having teeth 28 formed at its periphery meshing with the teeth of pinion 16. Gear wheel 26 also supports a load plate 34 located adjacent a face of the gear wheel and having teeth formed on its periphery, which are adapted to mesh with the teeth of pinion 16. The form of the gear teeth of the load plate is similar or identical to the form of the teeth 28 of gear wheel 26.

FIG. 2 shows that the web of the gear wheel 26 is formed with multiple holes angularly spaced about the axis of the countershaft and extending axially through the thickness of the gear wheel. Fitted within the holes are spacers 36, 37 formed of elastomer, such as urethane or rubber, having a serrated inner surface, which provides angularly separated, axially directed spaces 38 within which the serrations on the outer surface 40 of a sleeve 42 are fitted. This sleeve preferably is formed of metal and is located in the hole of the gear wheel between the radial inner surfaces of the spacers and the outer surface of a pin 44 fitted within a bore in the sleeve. Pin 44 has an integral manufactured headed end 46, which abuts the face of the load plate 34 located at one end, and a second headed end 48 at the opposite end of the pin, which may be in the form of a split washer retained in place in a annular groove 50. Pin 44 extends through the load plate and the sleeve. The axial distance between the internal faces of the washer 48 and the head 46 is slightly larger than the thickness of the load plate plus the axial length between the end faces of the spacers 36, 37. When installed, as shown in FIG. 3, spacer 37 has a flange 52, located between gear wheel 26 and load plate 34, which is truncated to avoid interference with the fillet that blends the web of the gear wheel to the central portion of the countershaft. Spacer 36 also has a flange 54 that abuts the opposite face of gear wheel 26 and is similarly truncated for the same purpose.

FIG. 5 shows that the center of the hole of the gear wheel is offset angularly from the center of the hole of the load plate when the teeth of the load plate and of the gear wheel are arranged to mesh concurrently with the teeth of pinion 16. When the gear wheel and load plate include multiple gear noise suppressors, as shown in FIG. 2, then the holes drilled through the gear wheel and load plate are offset angularly from one another by the same amount. The angular offset is such that, when measured tangentially from the center of the holes of the gear wheel and load plate, the linear distance is in the range of 0.020–0.030 inches.

After the holes in the plate and gear wheel are formed, the elastomeric spacers 36, 37 are located in position on the gear wheel and are forced into their holes from opposite axial sides until flanges 52 and 54 bear on the adjacent faces of the gear wheel. Then, metal spacer 42 is inserted into the gear wheel so that its serrations fit within the recesses provided on the inner surfaces of the spacers. Next, the bores in the center of the spacers 42 are aligned with the holes of the load plate, pins 44 are inserted into the aligned holes and split washer 48 is snapped into the recess at the end of the pins after the headed end 46 is placed in contact with the adjacent face of the load plate. In this position, the teeth on the periphery of the load plate are unaligned with the teeth of the gear wheel, but they can be brought into a closer state of alignment by rotating the load plate about the axis of the countershaft. This rotation is possible after the noise suppressors are installed because of the resiliency of the elastomer material from which the spacers are made. The elastomer is soft relative to the other metal components and deflects sufficiently far to permit pins 44 to fit through the load plate and the sleeve and for the teeth of the load plate and gear wheel to mesh concurrently with the teeth of pinion 16.

Having described the preferred embodiment of my invention what I claim and desire to secure by U.S. Letters Patent is:

1. In a gearset including first and second gear wheels mounted for rotation about first and second axes, respectively, each gear wheel having teeth meshing with the teeth of the other gear wheel, a device for suppressing gear rattle comprising:

a load plate mounted for rotation coaxially with the first gear wheel having teeth adapted to mesh with the teeth of the second gear wheel and a hole having a center spaced radially from the first axis;

the first gear wheel having a hole whose center is spaced radially from the first axis substantially the same radial distance as the center of the hole of the load plate is spaced from the first axis, the center of the hole said first gear wheel being offset angularly from the center of the hole of the load plate when the teeth of the load plate and of the first gear wheel are arranged to mesh with the teeth of the second gear wheel;

a spacer made from readily deformable material located in the hole of the first gear wheel, having a first portion extending in a first direction axially beyond the first gear wheel and adjacent the load plate whereby said load plate and said first gear wheel are spaced apart, and a second portion extending in a second direction axially beyond the first gear wheel; and a pin extending through the spacer and the holes of the load plate and of the first gear wheel, having a first headed end located adjacent the load plate, and a second headed end located adjacent the second portion of the spacer, adapted to angularly align the holes of the load plate and of the first gear wheel, whereby the load plate teeth are resiliently urged due to deformation of the spacer into contact with a first face of the teeth of the second gear wheel and the first gear wheel teeth contact the teeth of the second gear wheel on the opposite side from the first face.

2. The device of claim 1 further including a sleeve located in the hole of the first gear wheel between the pin and the spacer, having a first end located adjacent the load plate and a second end spaced axially from the second portion of the spacer and away from the second headed end of the pin.

3. The device of claim 2 wherein the sleeve includes radially directed serrations and the sleeve includes serrations adapted to mate along at least a portion of the axial length of the spacer with the serrations of the sleeve.

4. The device of claim 1, wherein the spacer is made from elastomeric material.

5. The device of claim 1 wherein the load plate has multiple holes spaced radially from the first axis, the first gear wheel has multiple holes whose centers are spaced radially from the first axis substantially the same radial distance as the centers of the holes of the load plate are spaced from the first axis, the centers of the holes of said first gear wheel holes being offset angularly from the centers of the holes of the load plate when the teeth of the load plate and of the first gear wheel are arranged to mesh with the teeth of the second gear wheel, and further comprising:

multiple spacers made from readily deformable material, each located in a hole of the first gear wheel, having a first portion extending in a first direction axially beyond the first gear wheel and adjacent the load plate, and a second portion extending in a second direction axially beyond the first gear wheel; and multiple pins, each pin located in a hole of the load plate and a hole of the first gear wheel, having a first headed end located adjacent the load plate and a second headed end located adjacent the second portion of the spacer.

6. The device of claim 5 further including multiple sleeves, each sleeve located in a hole of the gear wheel between the pin and the spacer, having a first end located adjacent the load plate and a second end spaced axially from the second portion of the spacer and away from the second headed end of the pin.

7. A device for suppressing backlash noise in a manual change-speed transmission comprising:

an input shaft rotatably mounted about an axis and adapted to be clutched to an engine, including an input pinion wheel fixed to the input shaft;

a countershaft rotatably mounted about a first axis parallel to the axis of the input shaft, including a gear wheel having a hole spaced radially from the first axis and teeth meshing with the teeth of the pinion wheel;

a load plate mounted for rotation coaxially with the countershaft having teeth adapted to mesh with the teeth of the pinion wheel, and a hole whose center is spaced radially from the first axis;

the gear wheel having a hole whose center is spaced radially from the first axis substantially the same radial distance as the center of the hole of the load plate is spaced from the first axis, said gear wheel hole having its center offset angularly from the center of the hole of the load plate when the teeth of the load plate and of the gear wheel are arranged to mesh with the teeth of the input pinion wheel;

a spacer made from readily deformable material located in the hole of the gear wheel, having a first portion extending in a first direction axially beyond the gear wheel and adjacent the load plate whereby said load plate and said first gear wheel are spaced apart, and a second portion extending in a second direction axially beyond the gear wheel; and a pin extending through the spacer and the holes of the load plate and the holes of the gear wheel, having a first headed end located adjacent the load plate, and a second headed end adjacent the second portion of the spacer, adapted to angularly align the holes of the load plate and gear wheel, whereby the load plate teeth are resiliently urged due to deformation of the spacer into contact with a first face of the teeth of the input pinion wheel and the gear wheel teeth into contact with a second face of the teeth of the input pinion wheel on the opposite side from the first face.

8. The device of claim 7 further including a sleeve located in the hole of the gear wheel between the the pin and the spacer, having a first end adjacent the load plate and a second end spaced axially from the second portion of the spacer and away from the second headed end of the pin.

9. The device of claim 8 wherein the sleeve includes radially directed serrations and the sleeve includes serrations adapted to mate along at least a portion of the axial length of the spacer with the serrations of the sleeve.

10. The device of claim 7 wherein the spacer is made from elastomeric material.

11. The device of claim 7 wherein the load plate has multiple holes spaced radially from the first axis, the gear wheel has multiple holes whose centers are spaced radially from the first axis and whose centers are offset angularly from the centers of the holes of the load plate when the teeth of the load plate and of the first gear wheel are arranged to mesh with the teeth of the second gear wheel, and further comprising:

multiple spacers made from readily deformable material each located in a hole of the gear wheel, having a first portion extending in a first direction axially beyond the gear wheel and adjacent the load plate, and a second portion extending in a second direction axially beyond the gear wheel; and multiple pins, each pin extending through the spacer and a hole of the load plate and of the gear wheel, having a first headed end located adjacent the load plate and a second headed end located adjacent the second portion of the spacer.

12. The device of claim 11 further including multiple sleeves, each sleeve located in a hole of the gear wheel between the surface of the pin and the radially inner surface of the spacer, having a first end adjacent the first face of the load plate and a second end spaced axially from the second end of the spacer and away from the second headed end of the pin.

* * * * *